March 8, 1960

J. J. HAGOPIAN 2,928,078

MAGNETIC TRANSDUCER

Filed Aug. 16, 1956

INVENTOR.
JACOB J. HAGOPIAN

BY

ATTORNEY

United States Patent Office 2,928,078
Patented Mar. 8, 1960

2,928,078

MAGNETIC TRANSDUCER

Jacob J. Hagopian, Santa Clara County, Calif., assignor to International Business Machines Corporation, New York, N.Y., a corporation of New York Application August 16, 1956, Serial No. 604,425

3 Claims. (Cl. 340—174)

The present invention pertains generally to magnetic transducers and relates more particularly to magnetic transducers adapted for static sensing of magnetically recorded data.

Generally, relative motion between the magnetic record and the transducer is required to convert the magnetically recorded data to signal voltages representative thereof; however, several transducers have been developed in recent years which permit static sensing of magnetically recorded data without relative motion between the magnetic record and the transducer. One of these, U.S. Patent 2,700,703, proposes modulation of the reluctance of a portion of the core, thereby varying the reluctance of the path taken by the flux emanating from the magnetically recorded data, and in this way causes a voltage representative of the data to be induced across the read-record winding of the transducer. The present invention is directed to a transducer wherein the reluctance of substantially all of the core is modulated, as opposed to modulation of only a portion thereof, thereby yielding higher sensitivity and thus an increased signal-to-noise ratio.

Thus, one object of the present invention is to provide an improved magnetic transducer capable of sensing magnetically recorded data without relative motion between the data and the transducer.

Another object is to provide a more sensitive transducer of the type described above.

A further object is to provide a transducer capable of sensing magnetic data statically, which has improved means for modulating the reluctance of the core thereof.

Other objects of the invention will be pointed out in the following description and claims and illustrated in the accompanying drawings, which disclose, by way of example, the principle of the invention and the best mode which has been contemplated of applying that principle.

Figure 1:
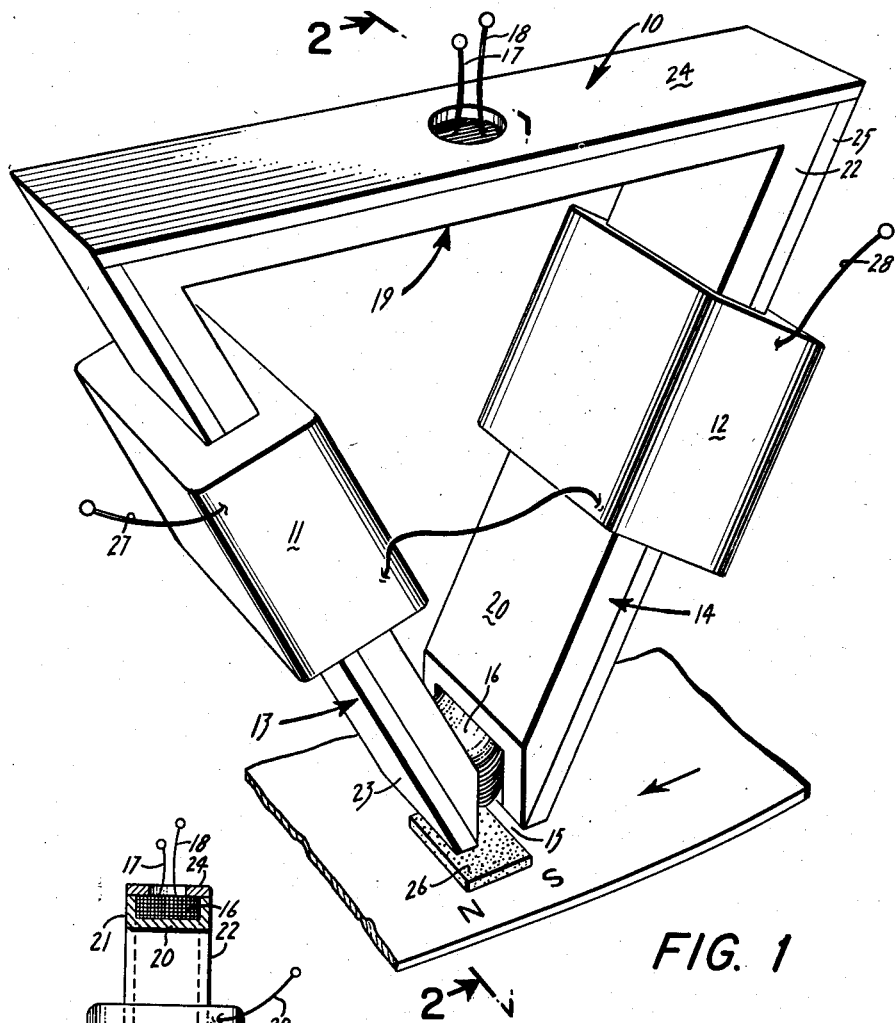
Fig. 1 is a perspective view of the novel transducer of the invention.
Figure 2:
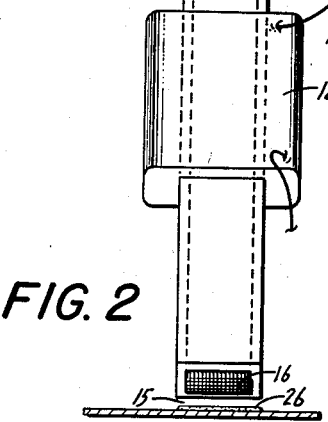
Fig. 2 is a vertical section taken along line 2—2 of Fig. 1.

Referring now to Fig. 1, the novel transducer generally comprises a delta core 10 having read-write windings 11, 12 disposed around legs 13 and 14 of the core 10. At their lower ends the legs are separated a slight amount to form a conventional high reluctance gap 15 for reading and recording. The core 10 is hollow to receive a reluctance modulating winding 16 having terminals 17 and 18, and for this reason the core is formed of a U-shaped member 19 having a back portion 20 and side walls 21 and 22 (Fig. 2). The hollow center of the core is enclosed by cover plates 23, 24 and 25, thereby enclosing the winding 16 as shown in the drawing. It should be understood that the present invention is not limited to the structure discussed above and that any convenient structure for accomplishing the results to be described may be utilized.

The purpose of the winding 16 is to modulate the reluctance of the core 10 by magnetizing it in accordance with an A.-C. signal applied across terminals 17 and 18. The frequency of the signal may be that which is convenient, a signal frequency between 10 and 100 kc. having been shown to be satisfactory. In this connection it should be noted that pulsating D.-C. may also be utilized and will yield satisfactory results.

As mentioned above, static sensing of magnetically recorded data implies that there is no relative motion between the data and the transducer and that, therefore, the magnetic flux emanating from the data does not vary in intensity through the windings of the coils 11, 12 and therefore does not generate a signal voltage in the coils representative of the data. By modulating the reluctance of the core, a changing reluctance is presented to the flux emanating from the data and in this way the flux is caused to vary in intensity through the coils 11, 12 and induce a signal voltage thereacross without relative motion being provided between the transducer and the data. This voltage is either A.-C. or pulsating D.-C. corresponding to the excitation voltage, and it is the second harmonic thereof.

It should be noted that the coils 11, 12 and the winding 16 are at right angles to each other and, therefore, that there is no mutual inductance therebetween. Additionally, the field generated by the winding 16 does not affect the magnetic record, provided that suitable driving voltages are utilized, since this field is substantially short-circuited by the core, the reluctance of this path being low in comparison with the high reluctance path to the record. Thus, it will now be clear that when a magnetic bit 26 is present at the gap 15 of the transducer and when an excitation voltage is applied across the terminals 17 and 18, a voltage appears across terminals 27 and 28 of the coils 11, 12 which corresponds in amplitude to the magnitude of the field emanating from the bit 26, thereby permitting static sensing of the magnetically recorded data.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magnetic transducer comprising a magnetic core which is closed but for a recording gap therein, said magnetic core having an internal passageway throughout its entire length, a sensing winding linking the core for sensing variations in magnetic flux, and an excitation winding extending through said passageway and across said gap.

2. In a magnetic transducer a hollow, closed core provided with an air gap, a winding around said core for recording and reproducing magnetic impulses, and a winding threaded interiorly through the entire length of said core and across said air gap for providing excitation flux.

3. A magnetic transducer comprising a magnetic core which is closed but for a recording gap therein, a sensing winding linking the core for sensing variations in magnetic flux, and an excitation winding internal to and extending longitudinal of the whole core and across the recording gap.

References Cited in the file of this patent

UNITED STATES PATENTS

| | | |
|---|---|---|
| 2,539,876 | Von Behren | Jan. 30, 1951 |
| 2,608,621 | Peterson | Aug. 26, 1952 |
| 2,700,703 | Nordyke | Jan. 25, 1955 |
| 2,704,789 | Kornei | Mar. 22, 1955 |
| 2,722,569 | Loper | Nov. 1, 1955 |
| 2,768,243 | Hare | Oct. 23, 1956 |

OTHER REFERENCES

"A Flux-Sensitive Reproducing Head for Magnetic Recording Systems" (Daniel), Proceedings of the Institute of Electrical Engineering, July 1955, pp. 442–446.